(12) United States Patent
Kamiyama et al.

(10) Patent No.: US 11,319,975 B2
(45) Date of Patent: May 3, 2022

(54) PIPE CONNECTION TOOL AND PIPE CONNECTION METHOD

(71) Applicant: SHONAN GOSEI-JUSHI SEISAKUSHO K.K., Hiratsuka (JP)

(72) Inventors: Takao Kamiyama, Hiratsuka (JP); Makoto Ishida, Hiratsuka (JP)

(73) Assignee: SHONAN GOSEI-JUSHI SEISAKUSHO K.K., Hiratsuka (JP)

( * ) Notice: Subject to any disclaimer, the term of this patent is extended or adjusted under 35 U.S.C. 154(b) by 0 days.

(21) Appl. No.: 17/056,863

(22) PCT Filed: May 15, 2019

(86) PCT No.: PCT/JP2019/019276
§ 371 (c)(1),
(2) Date: Nov. 19, 2020

(87) PCT Pub. No.: WO2019/230398
PCT Pub. Date: Dec. 5, 2019

(65) Prior Publication Data
US 2021/0207631 A1      Jul. 8, 2021

(30) Foreign Application Priority Data

May 31, 2018   (JP) .............................. JP2018-105239

(51) Int. Cl.
*F16L 3/08*        (2006.01)
*F16L 3/10*        (2006.01)
(Continued)

(52) U.S. Cl.
CPC .................. *F16B 2/08* (2013.01); *E04G 7/14* (2013.01); *F16B 7/04* (2013.01); *F16L 3/08* (2013.01); *F16L 3/10* (2013.01)

(58) Field of Classification Search
USPC ............ 248/65, 67, 67.7, 68.1, 69, 73, 74.1, 248/229.2, 229.25, 230.1, 230.6, 231.71,
(Continued)

(56) References Cited

U.S. PATENT DOCUMENTS 4,864,795 A * 9/1989 Burg .......................... F16B 7/04
52/646
4,939,923 A * 7/1990 Sharp ...................... F16L 39/00
285/373
(Continued)

FOREIGN PATENT DOCUMENTS

EP        0041855 A1    12/1981
JP        H-06300018 A  10/1994
(Continued)

OTHER PUBLICATIONS

International Search Report for Application No. PCT/JP2019/019276 dated Jun. 18, 2019.

*Primary Examiner* — Alfred J Wujciak
(74) *Attorney, Agent, or Firm* — Moser Taboada

(57) ABSTRACT

One cylindrical pipe is inserted into the hollow cylindrical portions of first and second holders made of hard plastic, and the other cylindrical pipe is inserted into the hollow semi-cylindrical portions. The first and second pipe holders are butted together at butt surfaces, respectively. The cylindrical pipe inserted into the butted hollow cylindrical portions is held in the hollow cylindrical portions using a clamping tool, and the cylindrical pipe inserted into a cylindrical portion that becomes hollow cylindrical by butting is held in the hollow semi-cylindrical portions using the clamping tool.

4 Claims, 15 Drawing Sheets

(51) Int. Cl.
*F16B 2/08* (2006.01)
*E04G 7/14* (2006.01)
*F16B 7/04* (2006.01)

(58) Field of Classification Search
USPC ............................... 248/218.4, 219.1, 219.3
See application file for complete search history.

(56) References Cited

U.S. PATENT DOCUMENTS

| | | | | |
|---|---|---|---|---|
| 5,015,116 | A * | 5/1991 | Nardone | B64G 9/00 403/174 |
| 6,343,891 | B1 * | 2/2002 | Combs | B62K 21/12 403/385 |
| 7,062,836 | B1 * | 6/2006 | Sorgi | F16B 7/00 285/123.1 |
| 2008/0290655 | A1 * | 11/2008 | Yang | F16B 12/40 285/179.1 |
| 2010/0132163 | A1 * | 6/2010 | Hasei | A01D 34/90 16/421 |
| 2014/0223745 | A1 * | 8/2014 | Eberhart | F16B 7/0493 29/897.31 |
| 2015/0027577 | A1 | 1/2015 | Kamiyama et al. | |

FOREIGN PATENT DOCUMENTS

| | | |
|---|---|---|
| JP | H-09235915 A | 9/1997 |
| JP | 2008/038942 A | 2/2008 |
| JP | 2014/125850 A | 7/2014 |
| WO | WO-2009/125559 A1 | 10/2009 |

\* cited by examiner

PIPE CONNECTION TOOL AND PIPE CONNECTION METHOD

TECHNICAL FIELD

The present invention relates to a pipe connecting tool and a pipe connecting method in which two cylindrical pipes are crossed and connected.

BACKGROUND ART

In temporary scaffolds or in civil engineering construction sites, connecting fittings for pipe connection are known in which pipes are clamped using a pair of clamping members and the crossing angle of the clamped pipes are changed by rotating both the clamping members (Patent Document 1 below).

Connecting metal fittings are further known in which one pipe is held at the top of a U-shaped bent member with the other pipe held at the receiving part formed at the bent part thereof and a wedge is pressed between both the pipes to connect them (Patent Document 2 below).

Conventionally, a method is further known in which segments are connected in the circumferential direction to assemble pipe units and a rehabilitation pipe constructed by connecting the pipe units in the longitudinal direction is used to rehabilitate an existing pipe. In this method, the segments are connected in the existing pipe to construct the rehabilitation pipe and support pipes are then assembled in the rehabilitation pipe to prevent the rehabilitation pipe from deforming during a time until a filler injected between the existing pipe and the rehabilitation pipe hardens (Patent Document 3 below)

PRIOR ART DOCUMENTS

Patent Documents

Patent Document 1: JP 2014-125850 A
Patent Document 2: JP 2008-38942 A
Patent Document 3: JP 2015-24561 A

SUMMARY OF INVENTION

Problems to be Solved

In assembling the support pipes in the rehabilitation pipe, it is necessary to perform inside the narrow rehabilitation pipe an operation in which metal pipes are crossed and connected with connecting metal fittings. This disadvantageously makes poor the work efficiency of assembling the support pipes because of the heavy weight of the connecting metal fittings. There was also a problem of many connecting locations, taking time to connect.

The present invention has been made to solve such problems, and an object thereof is to provide a lightweight pipe connecting tool and a pipe connecting method in which two cylindrical pipes are crossed and can be easily connected.

Means for Solving the Problems

The present invention (claim 1) relates to a pipe connecting tool in which two cylindrical pipes are crossed and connected, comprising:

a first pipe holder made of hard plastic having a hollow cylindrical portion into which one cylindrical pipe can be inserted inside, a hollow semi-cylindrical portion having a semicircular cross section into which one radial half of the other cylindrical pipe can be inserted, and a butt surface, on which the diameter side end surfaces of the hollow semi-cylindrical portion and one side end surface of the hollow cylindrical portion are on the same plane, the hollow cylindrical portion and the hollow semi-cylindrical portion being crossed according to the crossing angle of both the cylindrical pipes;

a second pipe holder made of hard plastic having a hollow cylindrical portion into which the one cylindrical pipe can be inserted inside, a hollow semi-cylindrical portion into which the other radial half of the other cylindrical pipe can be inserted, and a butt surface, on which the diameter side end surfaces of the hollow semi-cylindrical portion and one side end surface of the hollow cylindrical portion are on the same plane, the hollow cylindrical portion and the hollow semi-cylindrical portion being crossed according to the crossing angle of both the cylindrical pipes;

a clamping tool for clamping the outer circumference of the hollow cylindrical portion of the first and/or second pipe holders; and a clamping tool for clamping the outer circumference of the hollow semi-cylindrical portions of the first and second pipe holders, wherein the first and second pipe holders are butted together at the butt surfaces such that the end surfaces of the hollow cylindrical portions are butted to hold the one cylindrical pipe therein, and the other cylindrical pipe is held inside a cylindrical portion that becomes hollow cylindrical by butting the end surfaces of the respective hollow semi-cylindrical portions; and the first and/or second pipe holders is clamped by the clamping tool for clamping the outer circumference of the hollow cylindrical portion to hold the one cylindrical pipe inserted inside, and the first and second pipe holders are clamped by the clamping tool for clamping the outer circumference of the hollow semi-cylindrical portions to hold the other cylindrical pipe inserted inside.

The present invention also relates to a pipe connecting method in which two cylindrical pipes are crossed and connected using a pipe connecting tool according to any one of claims 1 to 6, inserting the one cylindrical pipe into the hollow cylindrical portion of the first and second holders;

inserting the other cylindrical pipe into one of the first and second holders;

butting the butt surfaces of the first and second pipe holders such that the end surfaces of the hollow cylindrical portions are butted to hold the one cylindrical pipe therein and the other cylindrical pipe is held inside a cylindrical portion that becomes hollow cylindrical by butting the end surfaces of the respective hollow semi-cylindrical portions; and clamping the outer circumference of the hollow cylindrical portion of the first and/or second pipe holder with the clamping tool to hold the one cylindrical pipe inserted inside, and clamping the outer circumference of the hollow semi-cylindrical portion of the first and second pipe holders with the clamping tool to hold the other cylindrical pipe inserted inside.

Effect of the Invention

According to the present invention, one cylindrical pipe is firmly held on the entire circumferential surface of the hollow cylindrical portion of the first and second pipe holders over the axial length thereof, and the other cylindrical pipe is firmly held on the entire circumferential surface of the hollow semi-cylindrical portion of the first and second pipe holders over the axial length thereof, so that the two cylindrical pipes can be firmly connected. Furthermore, in the present invention, the first and second pipe holders are made of hard plastic, so that they are lightweight and the pipes can be easily connected.

MODE OF CARRYING OUT THE INVENTION

Hereinafter, the present invention will be described based on embodiments shown in the accompanying drawings. The present invention is used when support pipes are assembled in a rehabilitation pipe, or when pipes are crossed and connected in temporary scaffolds and civil engineering construction sites, but it can also be applied to other fields such as technical fields in which pipes are crossed and connected to support objects using the connected pipes.

Embodiments

Figure 1:
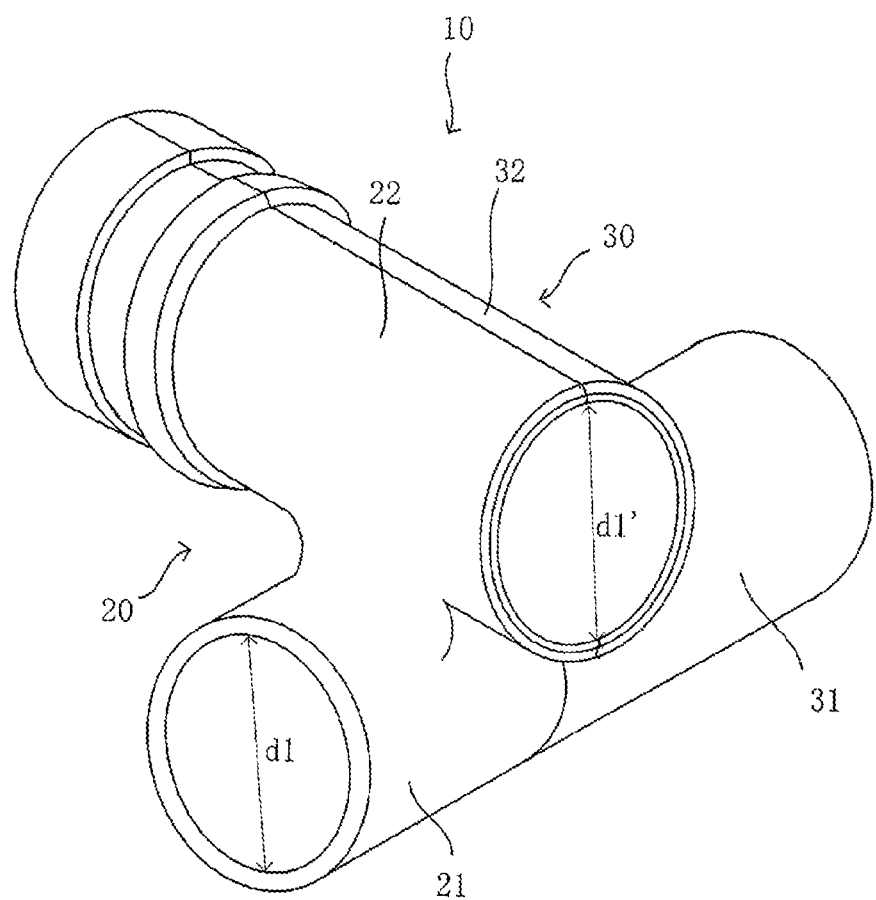
FIG. 1 is a perspective view showing the appearance of a pipe connecting tool according to an embodiment of the present invention.
Figure 2:
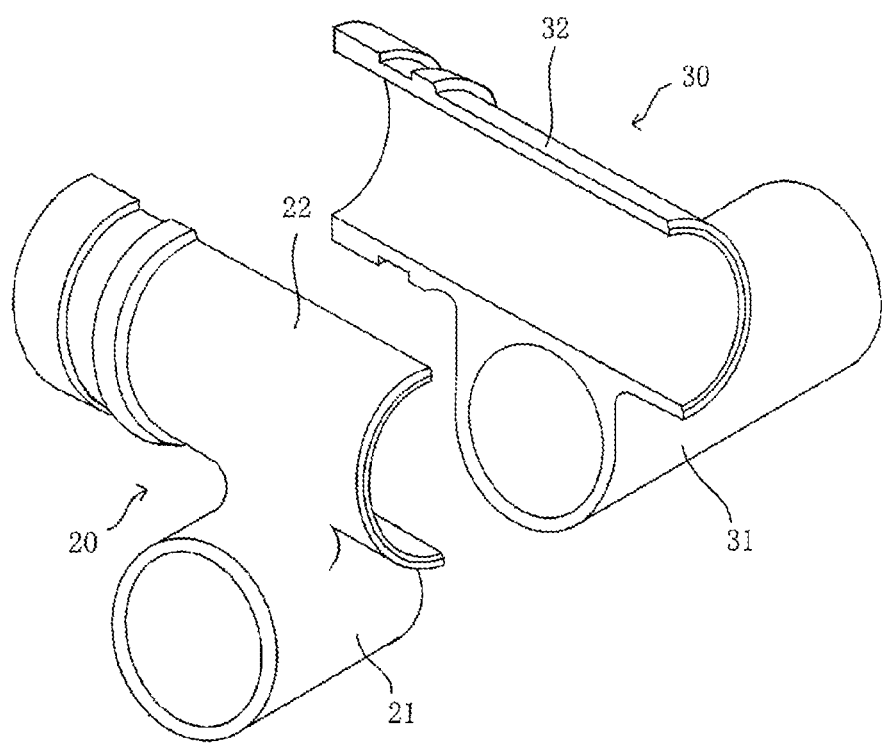
FIG. 2 is a perspective view as viewed when the pipe connecting tool is separated into two pipe holders.

A connecting tool 10 according to the present embodiment has a first pipe holder 20 and a second pipe holder 30 that are made of hard plastic, respectively. FIG. 1 shows a state in which the first and second pipe holders 20 and 30 are butted together, and FIG. 2 a state in which they are separated. The hard plastic includes hard vinyl chloride, hard polypropylene, hard polycarbonate, hard ABS, hard PET and the like.

Figure 7:
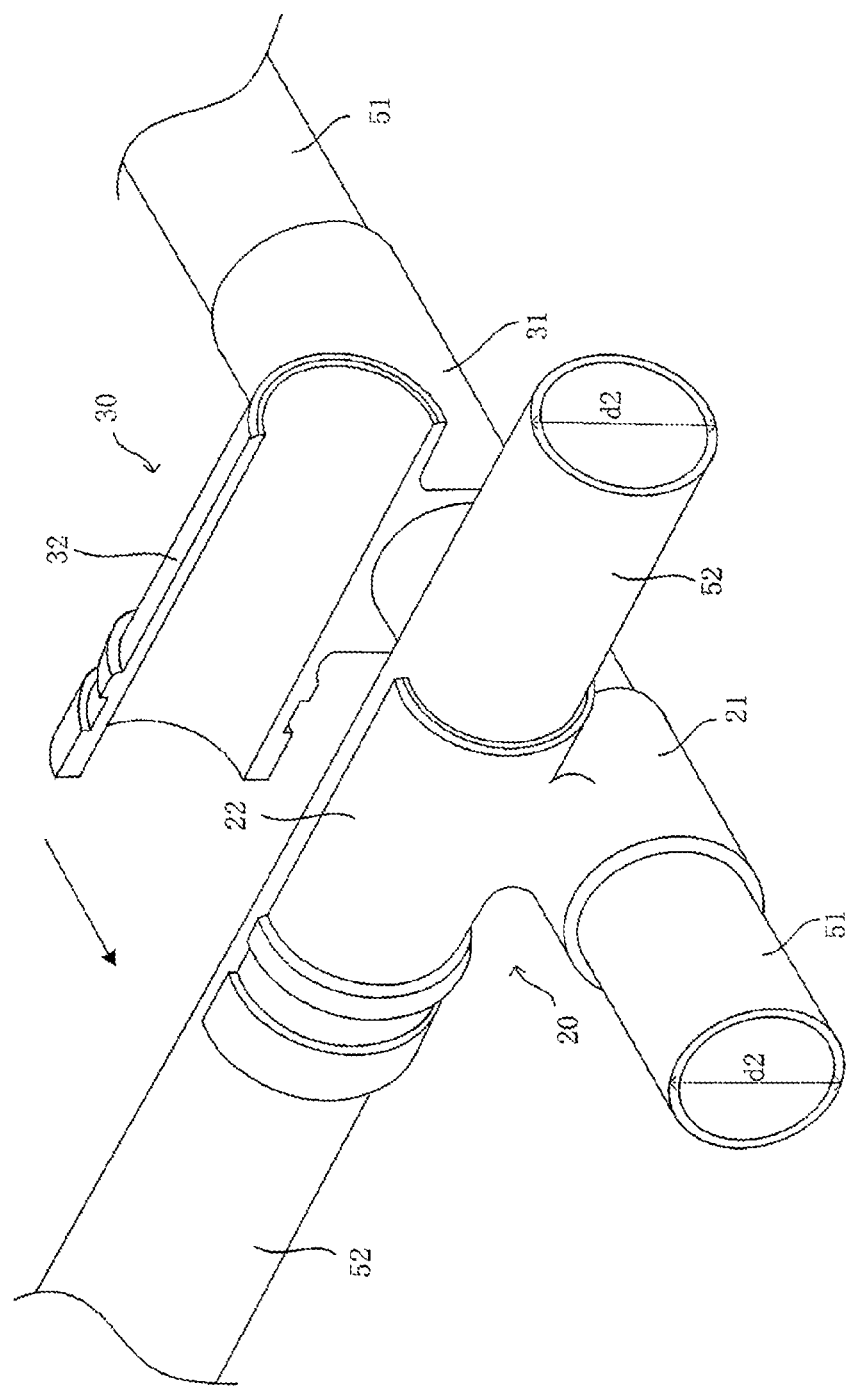
FIG. 7 is a perspective view showing a process of connecting two cylindrical pipes.

The pipe holder has two hollow cylindrical portions crossed into which a cylindrical pipe can be inserted, respectively. The pipe holder is cut into two pipe holders so that the one hollow cylindrical portion thereof is semicircular in cross section. The first pipe holder 20 corresponds to one pipe holder and the second pipe holder 30 to the other pipe holder. In this embodiment, two cylindrical pipes to be connected have the same outer diameter d2 (FIG. 7). In the present specification, the hollow cylindrical portion and the hollow semi-cylindrical portion express that their internal hollow shape is cylindrical and semi-cylindrical.

As shown in FIGS. 3a, 3b, 3c, 4a and 4b, the first pipe holder 20 includes a hollow cylindrical portion 21 having an inner diameter d1 slightly larger than the outer diameter d2 of one of cylindrical pipes to be connected. The one cylindrical pipe can be inserted into the hollow cylindrical portion 21.

Figure 3A:
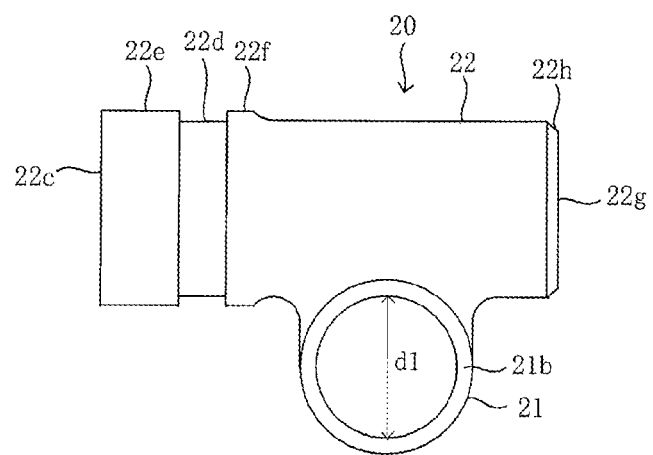
FIG. 3a is a front view of one pipe holder.
Figure 3B:
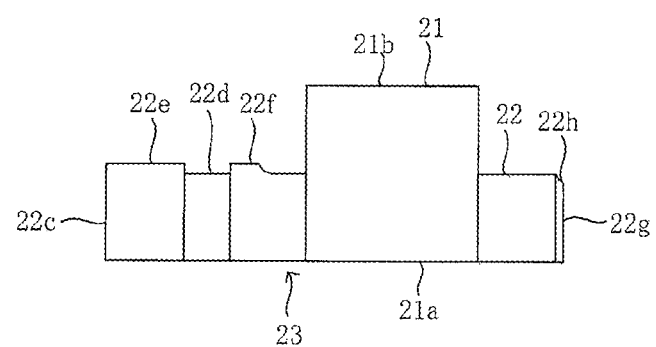
FIG. 3b is a bottom view of one pipe holder.
Figure 3C:
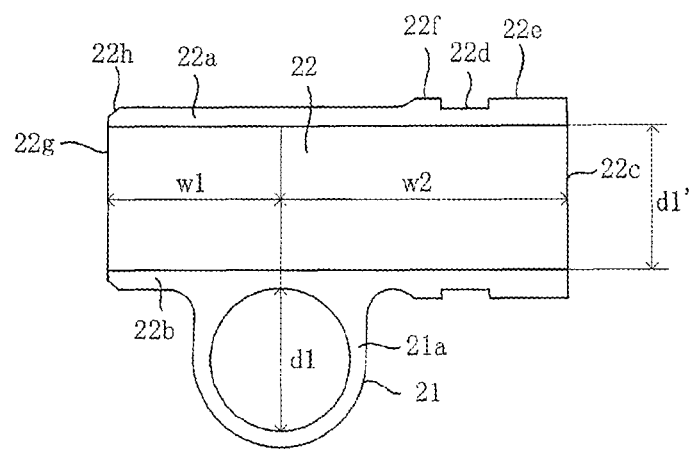
FIG. 3c is a rear view of one pipe holder.

The first pipe holder 20 also includes a hollow semi-cylindrical portion 22 having a semicircular cross section that is integrated with the hollow cylindrical portion 21 and intersects the hollow cylindrical portion 21 at an angle corresponding to the crossing angle of the two cylindrical pipes to be connected, in this embodiment, at an angle of 90 degrees. As shown in FIG. 3c, the hollow semi-cylindrical portion 22 has an inner diameter d1' slightly smaller than the outer diameter d2 of the other cylindrical pipe, so that one substantial radial half thereof can be inserted.

Figure 4A:
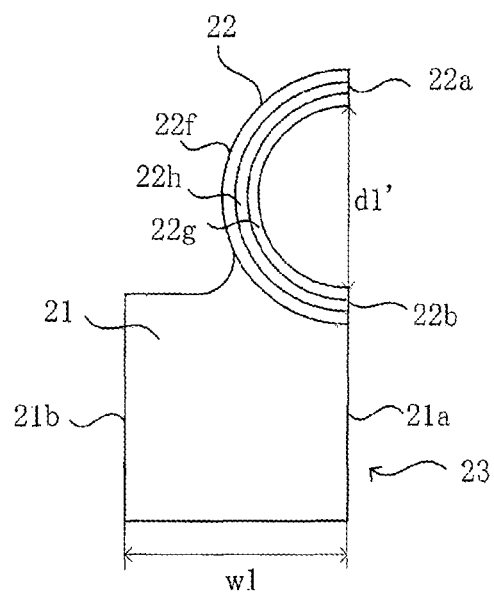
FIG. 4a is a right side view of one pipe holder.
Figure 4B:
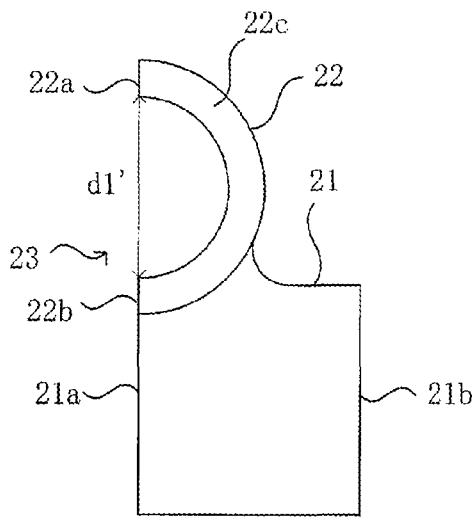
FIG. 4b is a left side view of one pipe holder.

As will be described later, the first pipe holder 20 has at one side a butt surface 23 that is butted against the second pipe holder 30. As shown in FIGS. 4a and 4b, on the butt surface 23, the one side end surface 21a of the hollow cylindrical portion 21 and the end surfaces 22a and 22b on the diameter side of the hollow semi-cylindrical portion 22 (the surface on the right side in FIG. 2 and the paper surface in FIG. 3c) are on the same plane.

The first pipe holder 20 has at the side opposite to the butt surface 23 a semicircular curved section of the hollow semi-cylindrical portion 22, and the hollow cylindrical portion 21 extends from the curved section thereof to form the other side end surface 21b.

The hollow semi-cylindrical portion 22 is provided on the side of one longitudinal end surface 22c with an attachment portion 22d to which a clamping tool is attached that clamps the hollow semi-cylindrical portions of the first and second pipe holders 20 and 30, as will be described later. On both sides of the attachment portion 22d, the hollow semi-cylindrical portion 22 has large diameter portions 22e and 22f. The hollow semi-cylindrical portion 22 has an inclined surface 22h on the side of the other longitudinal end surface 22g so that a cap as a clamping tool described later can be easily inserted.

The hollow cylindrical portion 21 intersects the hollow semi-cylindrical portion 22 at a position deviating from the longitudinal center thereof. As shown in FIG. 3c, the distance w1 from one end surface 22g of the hollow semi-cylindrical portion 22 to the vertical surface passing through the center of the hollow cylindrical portion 21 is shorter than the distance w2 from the other end surface 22c to the vertical surface. As shown in FIG. 4a, the distance between the end surfaces 21a and 21b of the hollow cylindrical portion 21 is w1.

As shown in FIGS. 5a, 5b, 5c, 6a and 6b, the second pipe holder 30 includes a hollow cylindrical portion 31 having an inner diameter d1 slightly larger than the outer diameter d2 of the other of cylindrical pipes to be connected. The other cylindrical pipe can be inserted into the hollow cylindrical portion 31, which thus has the same shape as the hollow cylindrical portion 21 of the first pipe holder 20. The hollow cylindrical portion 31 is provided in the axial direction with a notch 31c for facilitating the insertion of the cylindrical pipe and increasing a holding force.

Figure 5A:
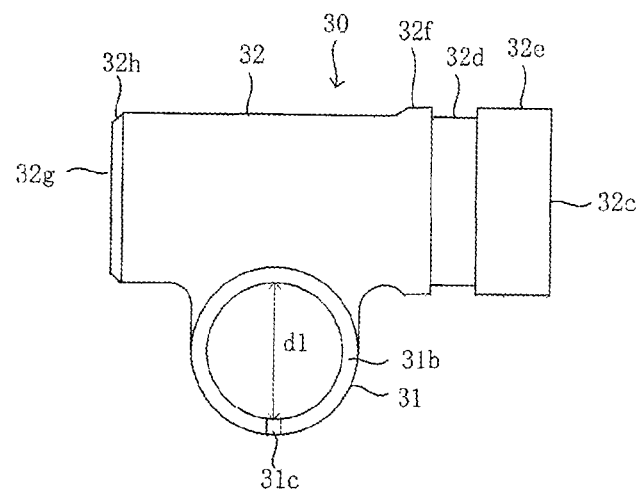
FIG. 5a is a front view of the other pipe holder.
Figure 5B:
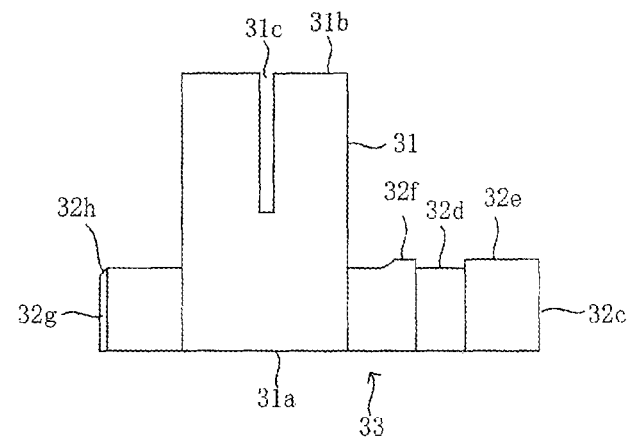
FIG. 5b is a bottom view of the other pipe holder.
Figure 5C:
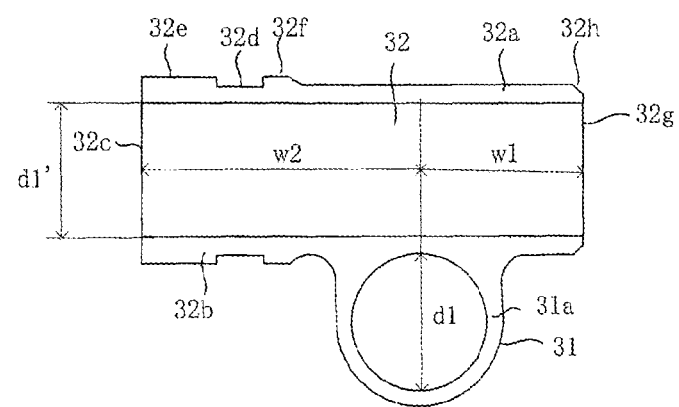
FIG. 5c is a rear view of the other pipe holder.

The second pipe holder 30 includes a hollow semi-cylindrical portion 32 having a semicircular cross section that is integrated with the hollow cylindrical portion 31 and intersects the hollow cylindrical portion 31 at an angle corresponding to the crossing angle of two cylindrical pipes to be connected, in this embodiment, at an angle of 90 degrees. As shown in FIG. 5c, the hollow semi-cylindrical portion 32 has an inner diameter d1' slightly smaller than the outer diameter d2 of the other cylindrical pipe, so that the other substantial radial half thereof can be inserted. The hollow semi-cylindrical portion 32 is plane-symmetrical with the hollow semi-cylindrical portion 22 of the first pipe holder 20 with respect to the radial cross section of the hollow cylindrical portion 31.

Figure 6A:
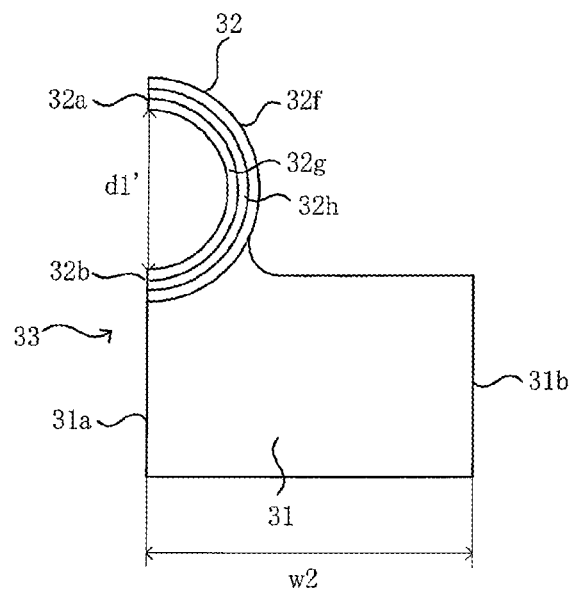
FIG. 6a is a right side view of the other pipe holder.
Figure 6B:
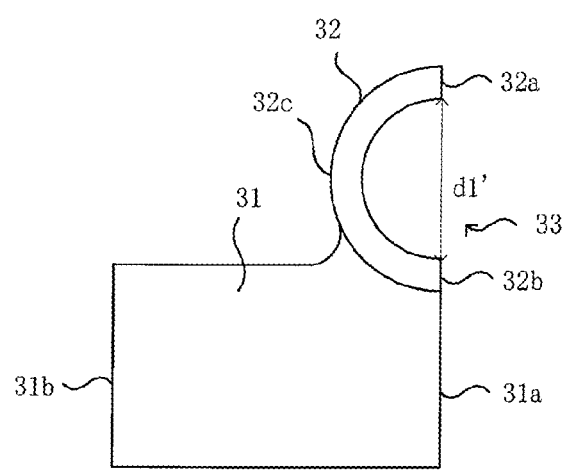
FIG. 6b is a left side view of the other pipe holder.

As will be described later, the second pipe holder 30 has at one side a butt surface 33 that is butted against the first pipe holder 20. As shown in FIGS. 6a and 6b, on the butt surface 33, the one side end surface 31a of the hollow cylindrical portion 31 and the end surfaces 32a and 32b on the diameter side of the hollow semi-cylindrical portion 32 (the surface on the left side in FIG. 2 and the paper surface in FIG. 5c) are on the same plane.

The second pipe holder 30 has at the side opposite to the butt surface 33 a semicircular curved section of the hollow semi-cylindrical portion 32, and the hollow cylindrical portion 31 extends from the curved section thereof to form the other side end surface 31b.

The hollow semi-cylindrical portion 32 is provided on the side of one longitudinal end surface 32c with an attachment portion 32d to which a clamping tool is attached that clamps the hollow semi-cylindrical portions 22, 32 of the first and second pipe holders 20 and 30, as will be described later. On both sides of the attachment portion 32d, the hollow semi-cylindrical portion 32 has large diameter portions 32e and 32f. The hollow semi-cylindrical portion 32 has an inclined surface 32h on the side of the other longitudinal end surface 32g so that a cap described later can be easily inserted.

The hollow cylindrical portion 31 intersects the hollow semi-cylindrical portion 32 at a position deviating from the longitudinal center thereof. As shown in FIG. 5c, the distance w1 from one end surface 32g of the hollow semi-cylindrical portion 32 to the vertical surface passing through the center of the hollow cylindrical portion 31 is shorter than the distance w2 from the other end surface 32c to the vertical surface. As shown in FIG. 6a, the distance between the end surfaces 31a and 31b of the hollow cylindrical portion 31 is w2.

With such a configuration, the first and second pipe holders 20 and 30 are butted together at the butt surfaces 23, 33 such that the end surfaces 21a and 31a of the hollow cylindrical portions 21 and 31 are the same and the hollow cylindrical portions 21 and 31 are butted so that one of the cylindrical pipes can be held inside. In this case, the end surfaces 22a and 22b of the hollow semi-cylindrical portion 22 of the first pipe holder 20 butt against the end surfaces 32a and 32b of the hollow semi-cylindrical portion 32 of the second pipe holder 30, so that a hollow cylindrical portion is formed inside of which the other cylindrical pipe can be held.

Figure 8:
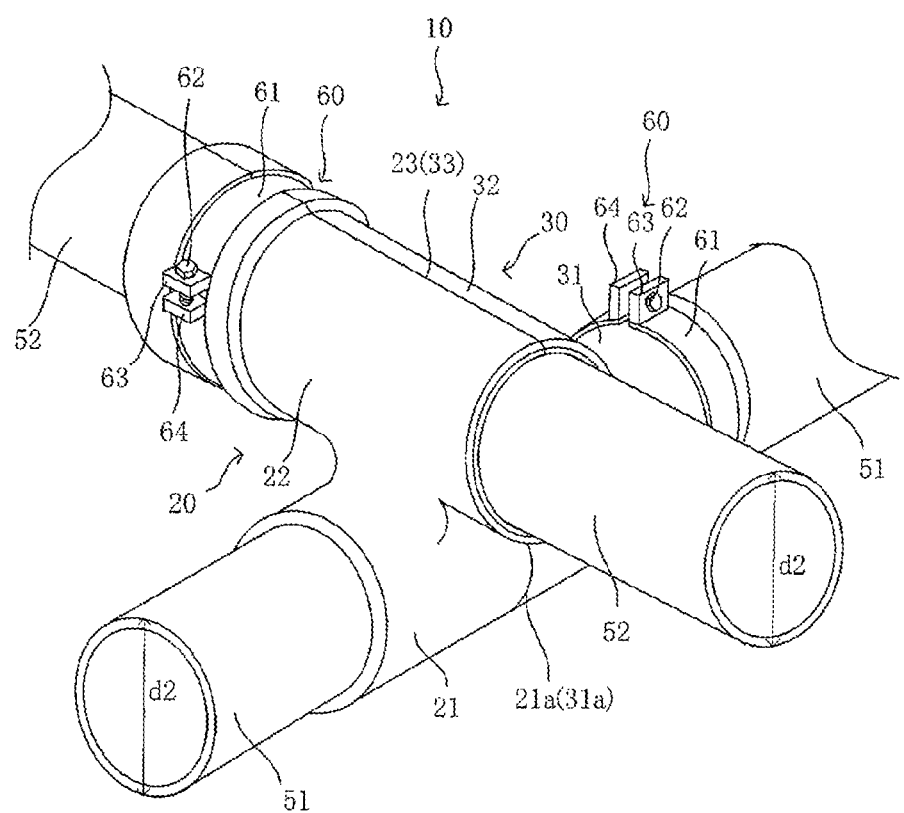
FIG. 8 is a perspective view showing the two connected cylindrical pipes.

FIGS. 7 and 8 show a state in which cylindrical pipes 51 and 52 are connected by the first and second pipe holders 20 and 30. As described above, the inner diameters d1 of the hollow cylindrical portions 21 and 31 are slightly larger than the outer diameter d2 of the cylindrical pipe 51. Therefore, as shown in FIG. 7, the cylindrical pipe 51 can be inserted into the hollow cylindrical portions 31 and 21. The inner diameter d1' of the hollow semi-cylindrical portion 22 is slightly smaller than the outer diameter d2 of the cylindrical pipe 52, so that the substantially radial half of the cylindrical pipe 52 can be inserted into the hollow semi-cylindrical portion 22.

Figure 9:
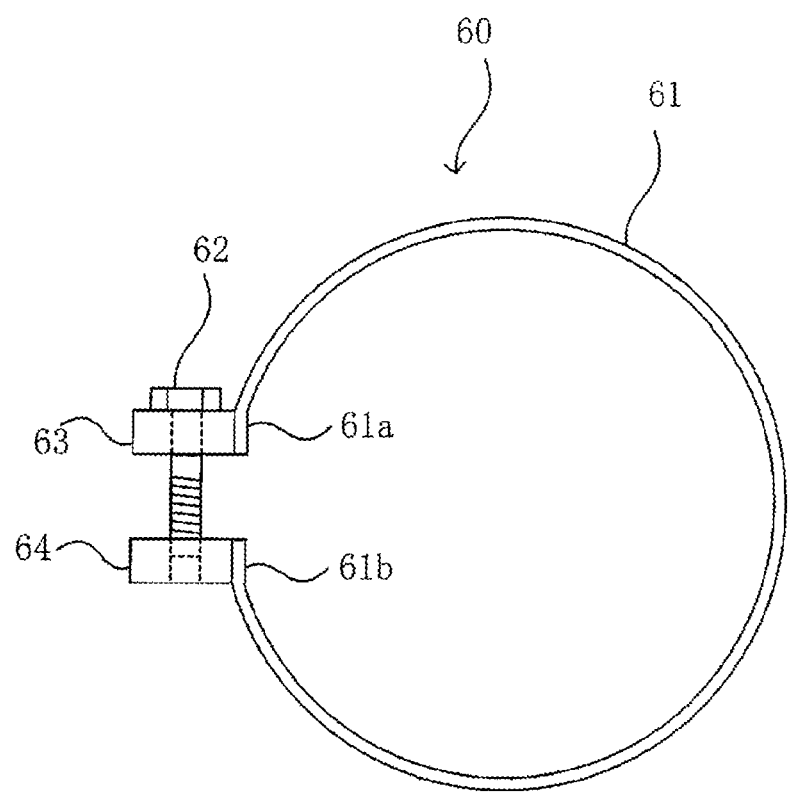
FIG. 9 is a side view showing one embodiment of a clamping tool.

Subsequently, as shown in FIG. 8, the end surfaces 21a and 31a of the hollow cylindrical portions 21 and 31 are butted to hold the cylindrical pipe 51. The end surfaces 22a and 22b of the hollow semi-cylindrical portion 22 are also butted against the end surfaces 32a and 32b of the hollow semi-cylindrical portion 32 to form a hollow cylindrical portion, so that the cylindrical pipe 52 is held therein. The inner diameter d1' of the hollow semi-cylindrical portions 22 and 32 is slightly smaller than the outer diameter d2 of the cylindrical pipe 52. Therefore, the end surfaces 22a and 22b of the hollow semi-cylindrical portion 22 is not completely butted against the end surfaces 32a and 32b of the hollow semi-cylindrical portion 32. This causes a slight gap to be generated between the end surfaces 22a and 22b and the end surfaces 32a and 32b according to the difference between d2 and d1'. In this state, a clamping tool 60 shown in FIG. 9 is used to securely hold the cylindrical pipes 51 and 52 to the first and second pipe holders 20 and 30.

The clamping tool 60 is configured as a hose band in which a flexible metal band 61 has nuts 63 and 64 fixed on both ends 61a and 61b with the one nut 63 provided with a hole for passing a bolt 62 and with the other nut 64 provided with a screw part into which the screw part of the bolt 62 is screwed. When the bolt 62 is screwed into the nut 64 until the nuts 63 and 64 come into contact with each other, the diameter of the band 61 becomes smaller than the outer diameter of the hollow cylindrical portion 31 or the outer diameter of the butted semi-cylindrical portions 22 and 32. When the bolt 62 is pulled out from the nut 64, the band 61 becomes larger than the outer diameter so that the band 61 can be attached to the outer circumference of the hollow cylindrical portion 31 or the attachment portions 22d and 32d of the hollow semi-cylindrical portions 22 and 32.

As shown in FIG. 8, the clamping tool 60 is attached and bolted to the outer end periphery of the hollow cylindrical portion 31 of the second pipe holder 30. The hollow cylindrical portion 31 is, as shown in FIGS. 5a and 5b, provided with the notch 31c (invisible in FIG. 8), so that the hollow cylindrical portion 31 bends and presses due to deflection the cylindrical pipe 51 inserted into the hollow cylindrical portion 31, thus allowing the cylindrical pipe 51 to be firmly held in the hollow cylindrical portion 31.

The clamping tool 60 is further attached and bolted to the attachment portions 22d and 32d provided in the hollow semi-cylindrical portions 22 and 32 of the first and second pipe holders 20 and 30. The gap is then reduced that is generated between the end surfaces 22a and 22b and the end surfaces 32a and 32b of the hollow semi-cylindrical portions 22, 32. This causes the cylindrical pipe 52 held therein to be clamped and firmly held in the hollow semi-cylindrical portions 22 and 32.

The first and second pipe holders 20 and 30 are thus firmly connected by the clamping force of the clamping tool 60, and the cylindrical pipes 51 and 52 held therein are firmly held on the entire circumferential surface over the axial lengths of the hollow cylindrical portion 31 and the hollow semi-cylindrical portions 22 and 32, so that the cylindrical pipes 51 and 52 can be firmly connected.

In order to increase a holding force relative to the cylindrical pipe 51, a plurality of notches 31c may be provided in the hollow cylindrical portion 31. Providing a plurality of notches allows the hollow cylindrical portion 31 to be made more flexible, so that the cylindrical pipe 51 can be held more firmly. Further, one or a plurality of notches are formed not only in the hollow cylindrical portion 31 but also in the hollow cylindrical portion 21. The clamping tool 60 clamps the hollow cylindrical portion 21 to hold the cylindrical pipe 51 also in the hollow cylindrical portion 21. The clamping tool 60 can thus be attached to the hollow cylindrical portion 31 and/or the hollow cylindrical portion 21 to clamp the outer circumference thereof.

In order to increase a holding force relative to the cylindrical pipe 52, the difference between the outer diameter d2 of the cylindrical pipe 52 and the inner diameters d1' of the hollow semi-cylindrical portions 22 and 32 may be increased. Unlike the cylindrical pipe 51, the cylindrical pipe 52 is not inserted entirely, but is inserted in half, so that it can be easily inserted into the hollow semi-cylindrical portions 22 and 32. If the difference between d2 and d1' is increased within the possible range, the holding force for the cylindrical pipe 52 can be further increased.

Figure 10:
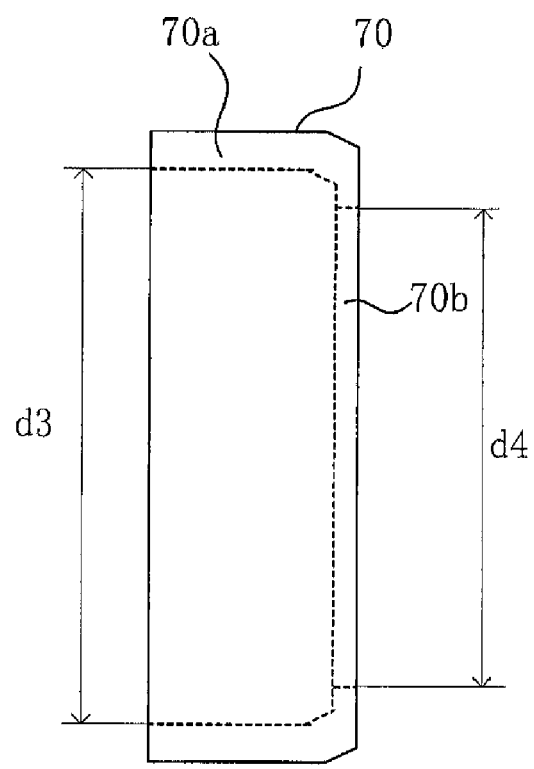
FIG. 10 is a side view showing another embodiment of a clamping tool.

As a clamping tool, a cap 70 as shown in FIG. 10 may be used. The cap 70 has a hollow cylindrical portion 70a having an inner diameter d3 that allows the cap to be press-fitted to the outside of the hollow cylindrical portions 21 and 31 or the butted semi-cylindrical portions 22 and 23. The cap 70 also has on the side opposite to the hollow cylindrical portion 70a a hollow cylindrical portion 70b which has a diameter d4 slightly larger than the outer diameter d2 of the cylindrical pipes 51 and 52 to allow them to pass therethrough.

Figure 11:
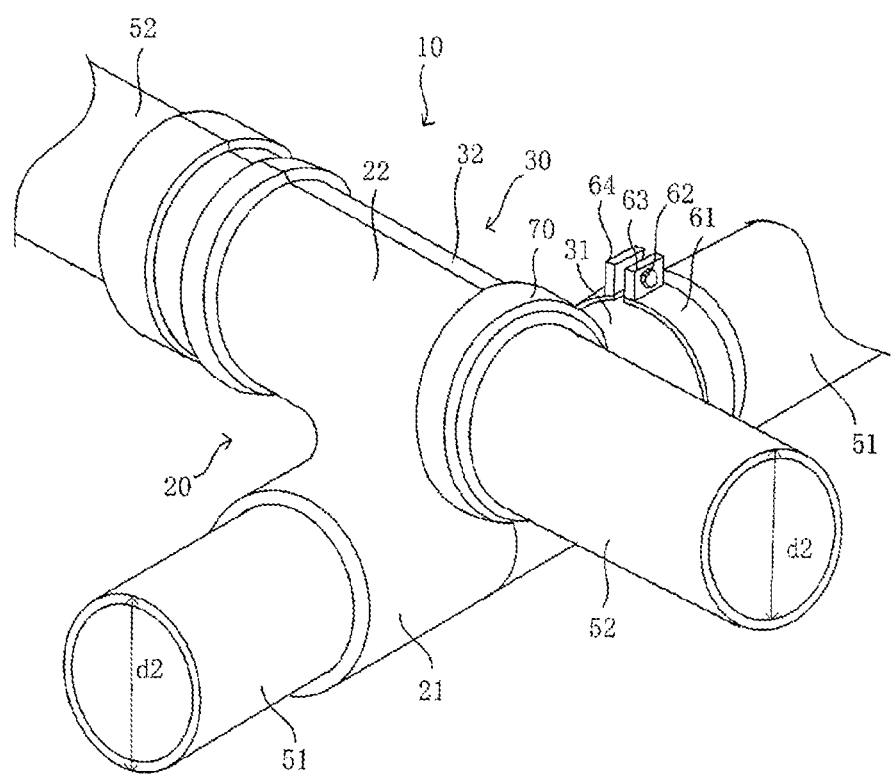
FIG. 11 is a perspective view showing a state in which different clamping tools are used to connect two cylindrical pipes.

FIG. 11 shows an embodiment in which the hollow semi-cylindrical portions 22 and 32 of the first and second holders 20 and 30 are tightened using the cap 70 instead of the clamping tool 60. The cap 70 is press-fitted from one end of the cylindrical pipe 52 through the hollow cylindrical portion 70b to the ends of the hollow semi-cylindrical portions 22 and 32 to tighten the end portions thereof. This tightening allows the cylindrical pipe 52 inserted inside to be tightened and firmly held by the hollow semi-cylindrical portions 22 and 32.

As shown in FIG. 8, one end may be clamped with the hose band type clamp 60, and the other end may be tightened with the cap 70 as shown in FIG. 11. In this case, tightening is performed at both ends of the hollow semi-cylindrical portions 22 and 32, so that it is possible to connect the pipes more solidly.

Figure 12:
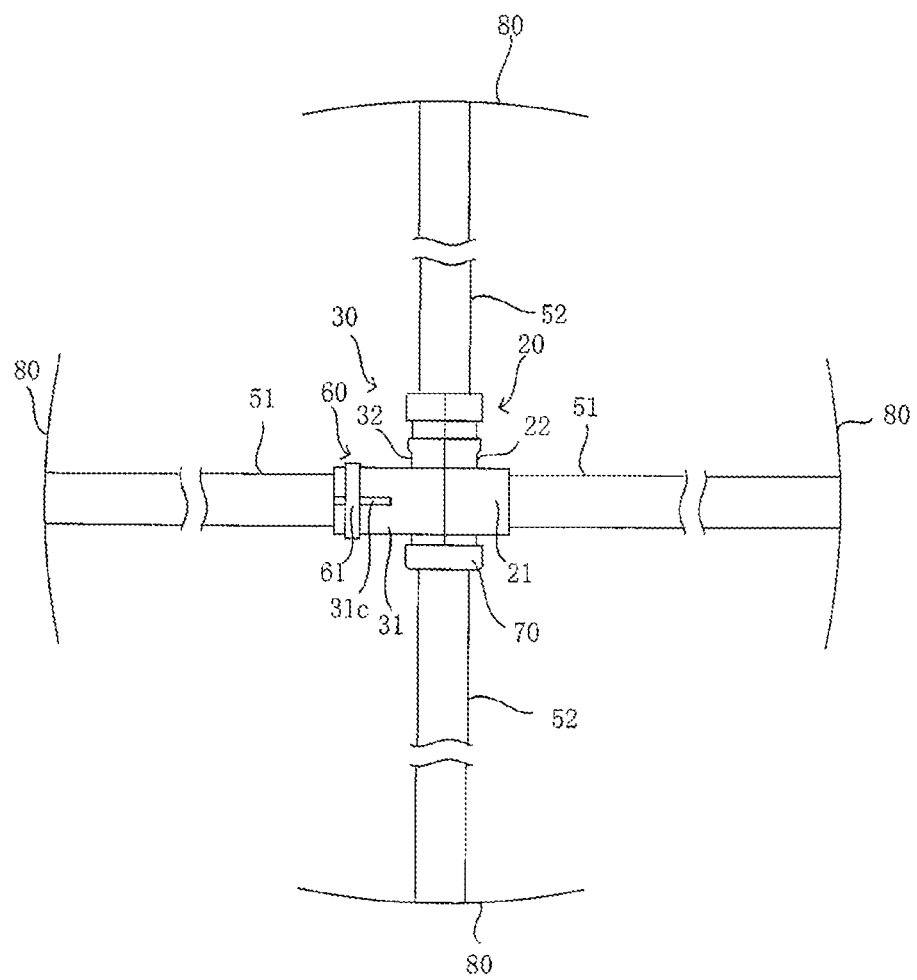
FIG. 12 is an illustrative view as viewed when a pipe connecting tool is used for support pipes.

FIG. 12 shows an embodiment in which the cylindrical pipes 51 and 52 are connected at right angles for application to support pipes for preventing deformation of a rehabilitation pipe of segments laid in an existing pipe such as a sewer. In FIG. 12, the cylindrical pipe 51 is inserted into the hollow cylindrical portions 21 and 31 of the first and second pipe holders 20 and 30, and it is clamped by the hose band type clamp 60 and held on the hollow cylindrical portions 21 and 31. On the other hand, the cylindrical pipe 52 is inserted into the butted hollow semi-cylindrical portions 22 and 32 of the first and second pipe holders 20 and 30, and it is tightened by the cap 70 type clamp and held on the hollow semi-cylindrical portion 22, 32. The cylindrical pipes 51 and 52 extend the same distance in the radial direction and hit segments 80 at their ends to support them. The cylindrical pipes 51 and 52 are firmly held on the entire peripheral surface of the hollow cylindrical portions 21, 31 and the hollow semi-cylindrical portions 22 and 32 over the axial lengths thereof. Therefore, the deformation of the rehabilitation pipe can be prevented even if a filler is injected between the existing pipe and the rehabilitation pipe and the individual segment 80 receives a load due to the filler injection. The first and second pipe holders 20 and 30 are made of plastic, so that they are lightweight and it is easy to assemble the support pipes even inside a dark existing pipe.

Figure 13:
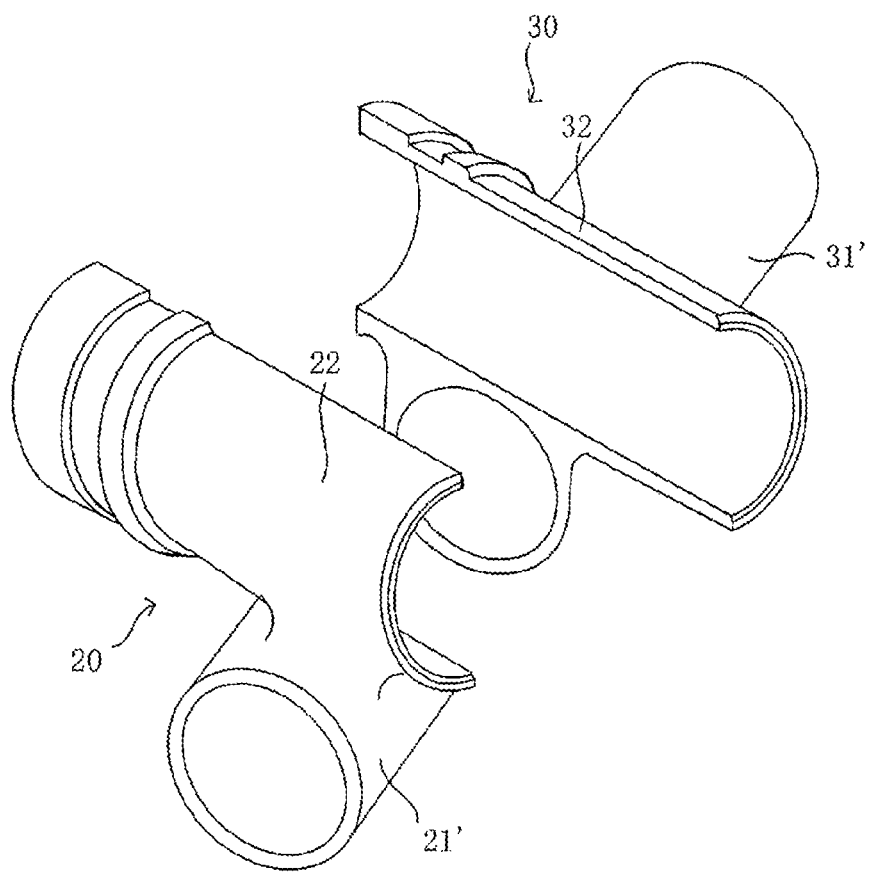
FIG. 13 is a perspective view showing a connecting tool in which two cylindrical pipes are crossed and connected at an angle different from a right angle.
Figure 14:
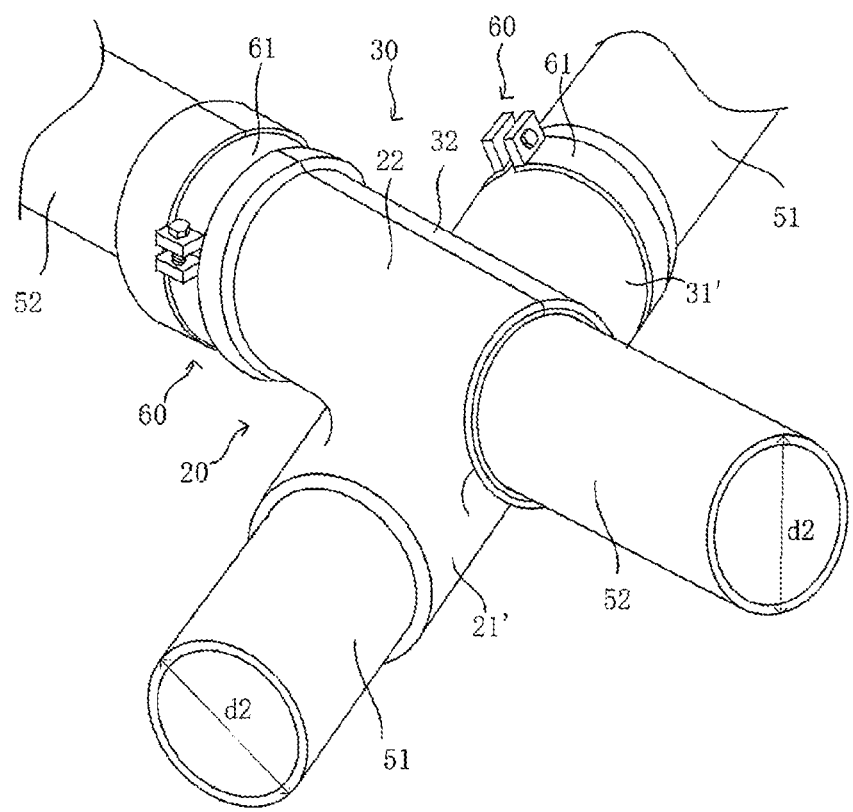
FIG. 14 is a perspective view showing a state in which the two cylindrical pipes are crossed and connected at an angle different from a right angle.

FIGS. 13 and 14 show an embodiment in which the cylindrical pipes 51 and 52 are diagonally connected to each other. In FIGS. 13 and 14, the hollow cylindrical portions 21' and 31' of the first holder 20 intersect the hollow semi-cylindrical portions 22, 32 of the first and second pipe holders 20, 30 at an angle slightly inclined to the left from a right angle. Only the positions and shapes of the end surfaces of the hollow cylindrical portions 21' and 31' on the butt surface change according to the crossing angle, and the configurations and functions are the same as those in the case where they are orthogonal, and the same effect can be obtained.

KEY TO THE SYMBOLS 10 connecting tool
20 first holder
21 hollow cylindrical portion
22 hollow semi-cylindrical portion
23 butt surface
30 second holder
31 hollow cylindrical portion
32 hollow semi-cylindrical portion
33 butt surface
51, 52 cylindrical pipe
60 clamping tool
61 band
70 cap
80 segment

The invention claimed is:

1. A pipe connecting tool in which two cylindrical pipes are crossed and connected, comprising:
a first pipe holder made of hard plastic having a hollow cylindrical portion into which one cylindrical pipe can be inserted, and passed therethrough; a hollow semi-cylindrical portion that has a semicircular cross section into which one radial half of the other cylindrical pipe can be inserted and passed therethrough and that is spaced away from the hollow cylindrical portion such that the one and the other cylindrical pipes inserted can cross each other; and a butt surface, on which the diameter side end surfaces of the hollow semi-cylindrical portion and one side end surface of the hollow cylindrical portion are the same, the hollow cylindrical portion and the hollow semi-cylindrical portion being crossed each other according to the crossing angle of both the cylindrical pipes;
a second pipe holder made of hard plastic having a hollow cylindrical portion into which the one cylindrical pipe can be inserted, and passed therethrough; a hollow semi-cylindrical portion that has a semicircular cross section into which the other radial half of the other cylindrical pipe can be inserted and passed therethrough and that is spaced away from the hollow cylindrical portion such that the one and the other cylindrical pipes inserted can cross each other; and a butt surface, on which the diameter side end surfaces of the hollow semi-cylindrical portion and one side end surface of the hollow cylindrical portion are the same, the hollow cylindrical portion and the hollow semi-cylindrical portion being crossed each other according to the crossing angle of both the cylindrical pipes;

a clamping tool for clamping the outer circumference of the hollow cylindrical portion of the first and/or second pipe holders; and a clamping tool for clamping the outer circumference of the hollow semi-cylindrical portions of the first and second pipe holders, wherein the first and second pipe holders are butted together at the butt surfaces such that the end surfaces of the hollow cylindrical portions are butted to pass the one cylindrical pipe, through the hollow cylindrical portions and pass the other cylindrical pipe through a cylindrical portion that becomes hollow cylindrical by butting the end surfaces of the respective hollow semi-cylindrical portions; and wherein the first and/or second pipe holders is clamped by the clamping tool for clamping the outer circumference of the hollow cylindrical portion to hold the one cylindrical pipe passed therethrough, and the first and second pipe holders are clamped by the clamping tool for clamping the outer circumference of the hollow semi-cylindrical portions to hold the other cylindrical pipe passed therethrough.

2. A pipe connecting tool according to claim 1, wherein the clamping tool for clamping the outer circumference of the hollow cylindrical portion is a hose band.

3. A pipe connecting tool according to claim 1, wherein the clamping tool for clamping the outer circumference of the hollow semi-cylindrical portion is a hose band.

4. A pipe connecting tool according to claim 1, wherein one or a plurality of notches are formed in the hollow cylindrical portion of the first and/or second pipe holder in the axial direction to facilitate insertion of the one cylindrical pipe and increase a holding force.

\* \* \* \* \*